(12) United States Patent
Downer

(10) Patent No.: US 7,904,663 B2
(45) Date of Patent: Mar. 8, 2011

(54) SECONDARY PATH FOR COHERENCY CONTROLLER TO INTERCONNECTION NETWORK(S)

(75) Inventor: Wayne A. Downer, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 1788 days.

(21) Appl. No.: 10/739,694

(22) Filed: Dec. 18, 2003

(65) Prior Publication Data

US 2005/0138298 A1    Jun. 23, 2005

(51) Int. Cl.
*G06F 13/14* (2006.01)
(52) U.S. Cl. ......................................... 711/141
(58) Field of Classification Search .................. None
See application file for complete search history.

(56) References Cited

U.S. PATENT DOCUMENTS

| 5,218,676 | A  | * | 6/1993  | Ben-Ayed et al. ............. 709/240 |
| 6,202,115 | B1 | * | 3/2001  | Khosrowpour ................ 710/312 |
| 6,263,415 | B1 | * | 7/2001  | Venkitakrishnan .............. 712/11 |
| 6,378,029 | B1 | * | 4/2002  | Venkitakrishnan et al. .. 710/317 |
| 6,912,612 | B2 | * | 6/2005  | Kapur et al. ................... 710/309 |
| 2003/0200330 | A1 | * | 10/2003 | Oelke et al. .................... 709/238 |
| 2004/0088523 | A1 | * | 5/2004  | Kessler et al. ................... 712/29 |
| 2004/0153754 | A1 | * | 8/2004  | Chen et al. ....................... 714/13 |

\* cited by examiner

*Primary Examiner* — Duc T Doan
(74) *Attorney, Agent, or Firm* — Steven Lieske Bennett

(57) ABSTRACT

Employing a coherency controller having a primary path and at least one secondary path to at least one interconnection network is disclosed. A method of an embodiment of the invention is performed by the coherency controller of a node. The coherency controller determines whether transactions are being properly sent to other nodes of a plurality of nodes of which the node is a part via a primary path. In response to determining that the transactions are not being properly sent to the at least one interconnection network via the primary path, the coherency controller instead sends the transactions to the other nodes via a secondary path.

18 Claims, 6 Drawing Sheets

SECONDARY PATH FOR COHERENCY CONTROLLER TO INTERCONNECTION NETWORK(S)

BACKGROUND OF THE INVENTION

1. Technical Field

This invention relates generally to a multiple-node system having a number of nodes communicatively connected to an interconnect, and more particularly to the connection paths between each node and the interconnect.

2. Description of the Prior Art

There are many different types of multi-processor computer systems. A Symmetric Multi-Processor (SMP) system includes a number of processors that share a common memory. SMP systems provide scalability. As needs dictate, additional processors can be added. SMP systems usually range from two to 32 or more processors. One processor generally boots the system and loads the SMP operating system, which brings the other processors online. Without partitioning, there is only one instance of the operating system. The operating system uses the processors as a pool of processing resources, all executing simultaneously, where each processor either processes data or is in an idle loop waiting to perform a task. SMP systems increase in speed whenever processes can be overlapped.

A Massively Parallel Processor (MPP) system can use thousands or more processors. MPP systems use a different programming paradigm than the more common SMP systems. In an MPP system, each processor contains its own memory and a copy of the operating system and application, or a portion of the application. Each subsystem communicates with the others through a high-speed interconnect. To use an MPP system effectively, an information-processing problem should be breakable into pieces that can be solved simultaneously. For example, in scientific environments, certain simulations and mathematical problems can be split apart and each part processed at the same time.

A Non-Uniform Memory Access (NUMA) system is a multi-processing system in which memory is separated into distinct banks. NUMA systems are types of SMP systems. In SMP systems, however, all processors access a common memory at the same speed. By comparison, in a NUMA system, memory on the same processor board, or in the same building block or node, as the processor is accessed faster than memory on other processor boards, or in other building blocks or nodes. That is, local memory is accessed faster than distant shared memory. NUMA systems generally scale better to higher numbers of processors than SMP systems.

Multiple-node systems in general have the nodes communicatively connected to one another through an interconnect. The interconnect may be one or more routers, one or more switches, one or more hubs, and so on. The transaction managers of each node in particular are communicatively connected to the interconnect, so that they can communicate with the other nodes. If a fault develops in the path of one of the transaction managers and the interconnect, this means that the transaction manager in question will not be able to communicate with the other nodes to ensure that memory and input/output (I/O) requests are serviced by the appropriate resources. In a NUMA system, this means that the transaction manager will not be able to access the remote resources of the other nodes. The transaction manager may thus not be able to operate properly when it does not have such remote resource access. For this and other reasons, therefore, there is a need for the present invention.

SUMMARY OF THE INVENTION

The invention relates to a secondary path for a coherency controller to an interconnection network. A method for the invention is performed by the coherency controller of a node. The coherency controller determines whether transactions are being properly sent via a primary path to other nodes of a plurality of nodes of which the node is a part. In response to determining that the transactions are not being properly sent via the primary path, the coherency controller instead sends the transactions to the other nodes via a secondary path.

A system of the invention includes at least one interconnection network and a number of nodes connected to one another via the at least one interconnection network. Each node includes processors, local memory for the processors, a number of paths connecting the node to the at least one interconnection network, and coherency controllers. The local memory may include Random Access Memory (RAM). Each coherency controller processes transactions relating to a portion of the total memory space, and sends transactions to be processed by other nodes to the other nodes through a primary path to the at least one interconnection network, which is one of the paths connecting the node to the at least one interconnection network. Each coherency controller also has one or more secondary paths to the at least one interconnection network, which are one or more other of the paths connecting the node to the interconnection network.

A node of a multi-node system of the invention includes local memory, coherency controllers, and a number of paths connecting the node to at least one interconnection network. The coherency controllers process transactions relating to a portion of the total memory space within the system, and send transactions to be processed by other nodes to the other nodes through the at least one interconnection network. Each coherency controller has a primary path to the at least one interconnection network, which is one of the paths that connect the node to the at least one interconnection network, and one or more secondary paths to the at least one interconnection network, which are one or more other of the paths that connect the node to the at least one interconnection network.

Other features and advantages of the invention will become apparent from the following detailed description of the presently preferred embodiment of the invention, taken in conjunction with the accompanying drawings.

DESCRIPTION OF THE PREFERRED EMBODIMENT

Primary and Secondary Path to Interconnect

Figure 1:
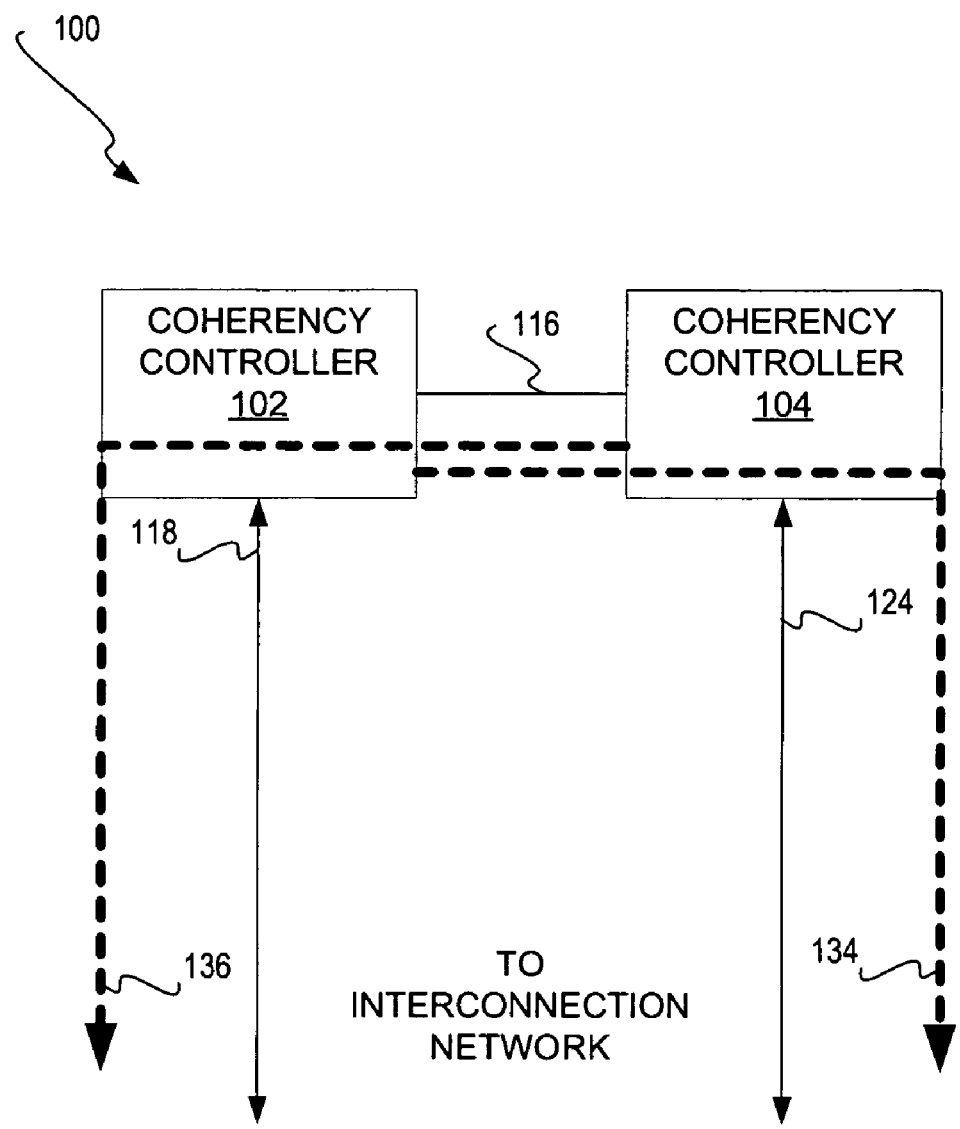
FIG. 1 is a diagram illustrating a coherency controller's primary, default path to an interconnect, as well as the coherency controller's secondary, alternative path to the interconnect, according to an embodiment of the invention, and is suggested for printing on the first page of the patent.

FIG. 1 shows a portion of a node 100, according to the present invention. The node 100 is part of a multiple-node system that includes other nodes and in which all the nodes are communicatively coupled to one another via an interconnect. The node 100 is specifically depicted as including coherency controllers 102 and 104. The controllers 102 and 104 may each be implemented as software, hardware, or a combination of software and hardware. For example, each of the controllers 102 and 104 may be an integrated circuit (IC), such as an application-specific IC (ASIC). In another embodiment of the invention, there may only be one of the coherency controllers 102 and 104 for the node 100, or more than two of the controllers 102 and 104, instead of the two coherency controllers 102 and 104 depicted in FIG. 1.

The coherency controllers 102 and 104 are each designed to receive transactions generated from within the node 100, to process the transactions that relate to a portion of the total memory space within the multiple-node system, and to send the transactions which require processing by other nodes, to the other nodes. Transactions include requests and responses to resources such as memory. For instance, a request may ask that data be read from or written to memory or another resource for which the coherency controllers 102 and 104 are responsible, whereas a response may answer such a request, indicating that the request has or has not been performed. Each of the coherency controllers 102 and 104 may be responsible for processing transactions that relate to a different portion of the total system memory. For instance, the controller 102 may be responsible for even lines of memory, and the controller 104 may be responsible for odd lines of memory. The coherency controllers 102 and 104 are connected to one or more interconnection networks of the multiple-node system via separate interconnects 118 and 124, so that the coherency controllers 102 and 104 can send transactions intended for processing by other nodes to the other nodes. There is also a local interconnect 116 between the controllers 102 and 104, although this is optional.

Interconnects 118 and 124 are independent interconnects for the node 100 to communicate with other nodes of the system of which the node 100 is a part. The interconnect 118 may be the primary, or nominal or default, path for requests and responses relating to even lines of memory, whereas the interconnect 124 may be the primary, or nominal or default, path for requests and responses relating to odd lines of memory. As depicted in FIG. 1, the coherency controller 102 is connected to the interconnect 118, whereas the coherency controller 104 is connected to the interconnect 124, although this is not required.

If a fault develops within the interconnect 118, or requests and responses relating to, for instance, even lines of memory are otherwise not able to be communicated over the interconnect 118, then the interconnect 124 serves as the secondary, or alternate, path 134 for such requests and responses. For instance, the requests and responses may be sent from the coherency controller 102, over the local interconnect 116, where it is presented, to the coherency controller 104, for communication over the interconnect 124. Importantly, there are two independent and separate interconnects 118 and 124 connecting the node 100 to the other nodes of the system of which the node 100 is a part, such that the interconnect 118 serves as the primary path for some requests and responses, such as those relating to even lines of memory, and the interconnect 124 serves as the alternate path for these requests and responses. That is, the interconnects 118 and 124 are completely separate from one another, and may interconnect to different interconnection networks, as will be described in relation to FIG. 2 later in the detailed description.

Similarly, if a fault develops within the interconnect 124, or requests and responses relating to, for instance, odd lines of memory are otherwise not able to be communicated over the interconnect 124, then the interconnect 118 serves as the secondary, or alternate, path 136 for such requests and responses. For instance, the requests and responses may be sent from the coherency controller 102, over the local interconnect 116, where it is presented, to the coherency controller 104, for communication over the interconnect 118. Importantly, there are two independent and separate interconnects 118 and 124 connecting the node 100 to the other nodes of the multi-node system of which the node 100 is a part, such that the interconnect 124 serves as the primary path for some requests and responses, such as those relating to odd lines of memory, and the interconnect 118 serves as the alternate path 136 for these requests and responses. That is, the interconnects 118 and 124 are completely separate from one another, and may interconnect to different interconnection networks, as will be described in relation to FIG. 2 in the next section of the detailed description.

System and Detailed Node

Figure 2:
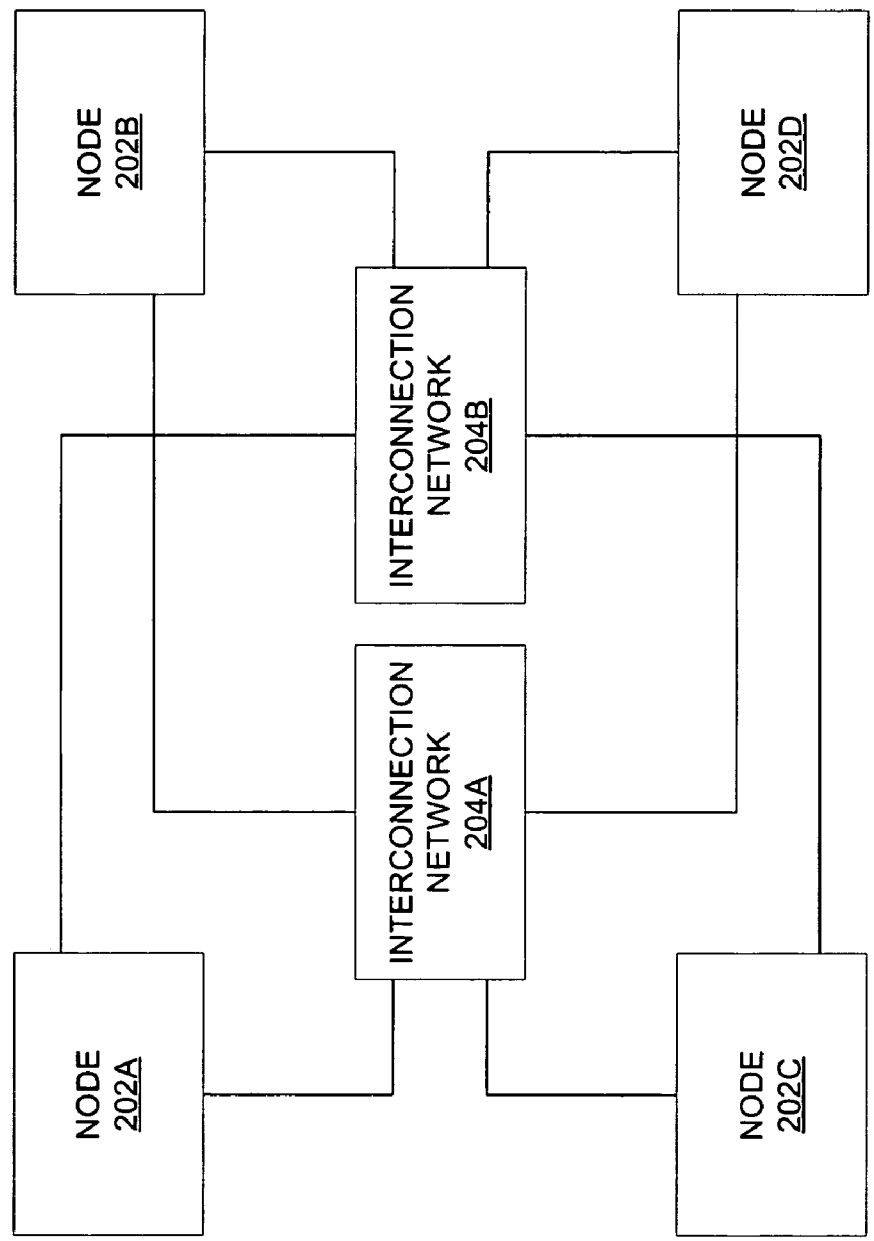
FIG. 2 is a diagram of a system having a number of multi-processor nodes, in conjunction with which embodiments of the invention may be implemented.

FIG. 2 shows a system 200 in accordance with which embodiments of the invention may be implemented. The system 200 includes a number of multiple-processor nodes 202A, 202B, 202C, and 202D, which are collectively referred to as the nodes 202. Each of the nodes 202 may be implemented in part as the node 100 of FIG. 1 that has been described. The nodes 202 are connected with one another through two interconnection networks 204A and 204B, which are collectively referred to as the interconnection networks 204. While two interconnection networks 204 are depicted in FIG. 2, more generally there is at least one interconnection network connecting the nodes 202 to one another. There furthermore may be more than two interconnection networks.

Each of the nodes 202 had a separate and independent interconnect to each of the interconnection networks 204 in the embodiment of FIG. 2, such that each of the nodes 202 has two separate and independent paths to the other of the nodes 202. Each of the nodes 202 may include a number of processors and memory. The memory of a given node is local to the processors of the node, and is remote to the processors of the other nodes. Thus, the system 200 can implement a non-uniform memory architecture (NUMA) in one embodiment of the invention.

Figure 3:
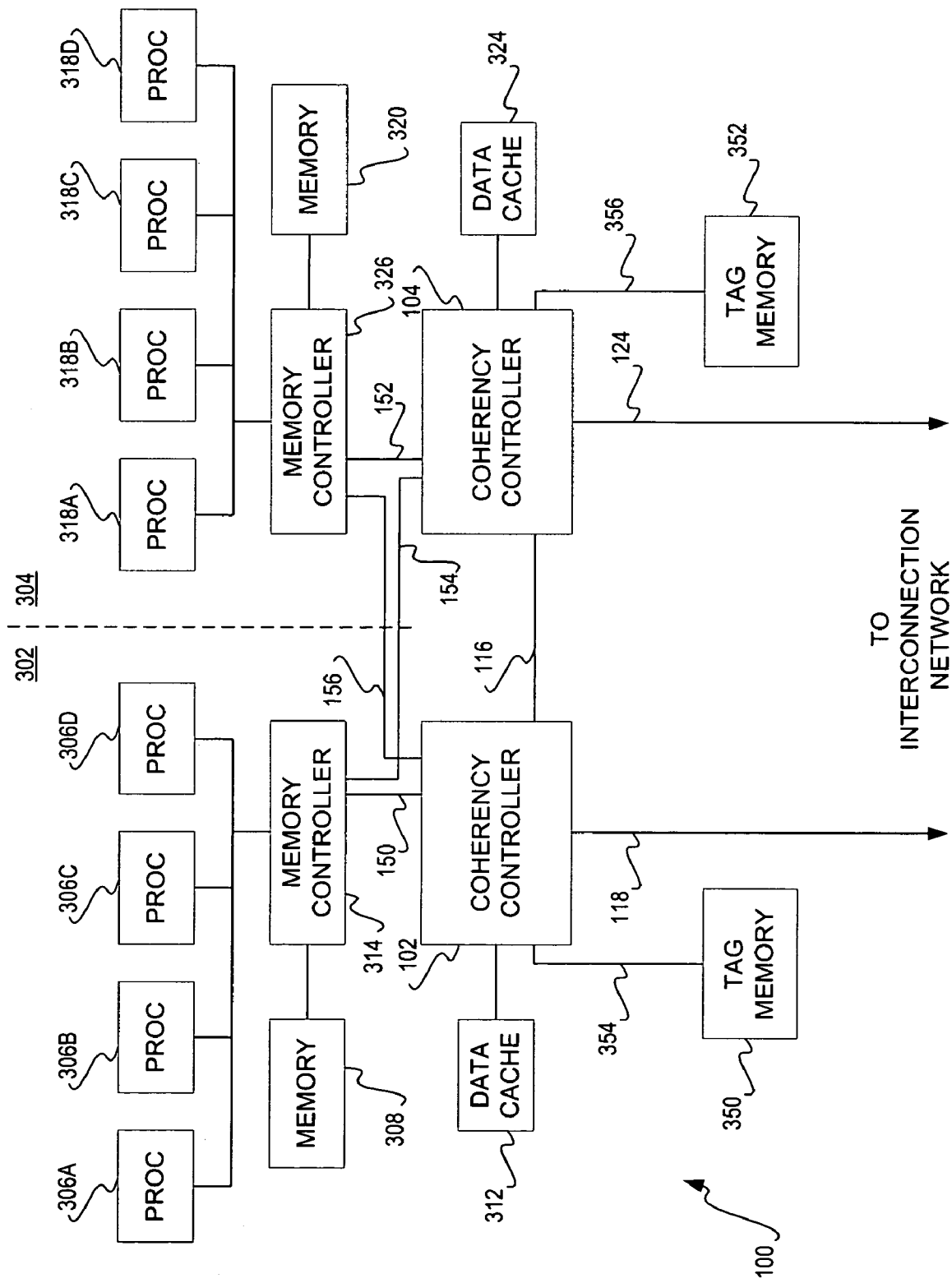
FIG. 3 is a diagram of one of the nodes of the system of FIG. 2 in more detail, according to an embodiment of the invention.

FIG. 3 shows in more detail the node 100, according to an embodiment of the invention that can implement one or more of the nodes 202 of FIG. 2. As can be appreciated by those of ordinary skill within the art, only those components needed to implement one embodiment of the invention are shown in FIG. 3, and the node 100 may include other components as well. The node 100 is divided into a first part 302 and a second part 304. The first part 302 has four processors 306A, 306B, 306C, and 306D, collectively referred to as the processors 306, whereas the second part 304 has four processors 318A, 318B, 318C, and 318D, collectively referred to as the processors 318. Each of the parts 302 and 304 can operate as a distinct partition, since each has four processors, or the parts 302 and 304 can operate together as a single partition.

The first part 302 has a memory 308, whereas the second part 304 has a memory 320. The memories 308 and 320 represent an amount of memory, such as Random Access Memory (RAM), local to the node. The memories 308 and 320 may be divided in a number of different ways. For instance, the memory 308 may have odd memory lines associated with it, whereas the memory 320 may have the even memory lines associated with it. As another example, the memory 308 may have the first half of the memory lines associated with node 100, whereas the memory 320 may have the second half of the memory lines associated with node 100. A memory line generally is a memory address.

The coherency controller 102 manages requests and responses for half of the total memory space associated with node 100, whereas the coherency controller 104 manages requests and responses for the other half of the total memory space associated with node 100. Each of the controllers 102 and 104 may be an applications-specific integrated circuit (ASIC) in one embodiment, as well as another combination of software and hardware. The controllers 102 and 104 also have data caches 312 and 324, respectively, for managing requests and responses that relate to remote memory, which is the local memory of the nodes other than the node 100. Stated another way, the memories 308 and 320 are local to the node 100, and are remote to nodes other than the node 100.

Requests and responses are types of transactions. The controllers 102 and 104 process transactions themselves that do not require processing by other nodes, and send transactions that do require processing by other nodes, to the interconnect. That is, the controller 102 processes transactions that relate to its portion of the total memory space 308. Similarly, the controller 104 processes transactions that relate to its portion of the total memory space 320. Transactions that require processing by other nodes are sent to the interconnect for processing by the other nodes.

Memory controller 314 interfaces the memory 308 and the processors 306, with the coherency controllers 102 and 104. Similarly, memory controller 326 interfaces the memory 320 and the processors 318 with coherency controllers 104 and 102. The coherency controllers 102 and 104 are able to communicate directly with each other via the communications link represented by the local interconnect 116.

There are two separate interconnects 118 and 124 connecting the node 100 to the interconnection network. The interconnect 118 serves as the primary interconnect for requests and responses relating to the coherency controller 102, whereas the interconnect 124 serves as the primary interconnect for requests and responses relating to the coherency controller 104. However, in case of failure of the interconnect 118, or failure of any other component within the node 100 that prevents requests and responses relating to the coherency controller 102 from being communicated over the interconnect 118, the interconnect 124 serves as the alternate interconnect for such requests and responses. Similarly, in case of failure of the interconnect 124, or failure of any other component within the node 100 that prevents requests and responses relating to the coherency controller 104 from being communicated over the interconnect 124, the interconnect 118 serves as the alternate interconnect for such requests and responses.

For example, in the case of failure of the interconnect 118, requests and responses relating to the coherency controller 102 may be sent to the coherency controller 104 via interconnect 116, and then over the interconnect 124 to the other nodes. As another example, in the case of failure of the interconnect 124, requests and responses relating to the coherency controller 104 may be sent to the coherency controller 102 via interconnect 116, and then over the interconnect 118 to the other nodes.

Tag memories 350 and 352 exist for the caches 312 and 324, respectively, through which the controllers 102 and 104 interface via the tag buses 354 and 356, respectively. The controller 102 thus accesses the tag memory 350 via the tag bus 354, whereas the controller 104 accesses the tag memory 352 via the tag bus 356. The tag memories 350 and 352 store information relating to the portion of the total memory space processed by coherency controller 102 and 104 respectively. Caches 312 and 324 store cache line data relating to the remote memory space processed by coherency controller 102 and 104 respectively. The tag memories 350 and 352, as well as the caches 312 and 324, may be external to the controllers 102 and 104. The controllers 102 and 104 utilize the information in tag memories 350 and 352 to determine whether a given memory address can be completely processed locally, or if it requires processing by other nodes.

Methods

Figure 4A:
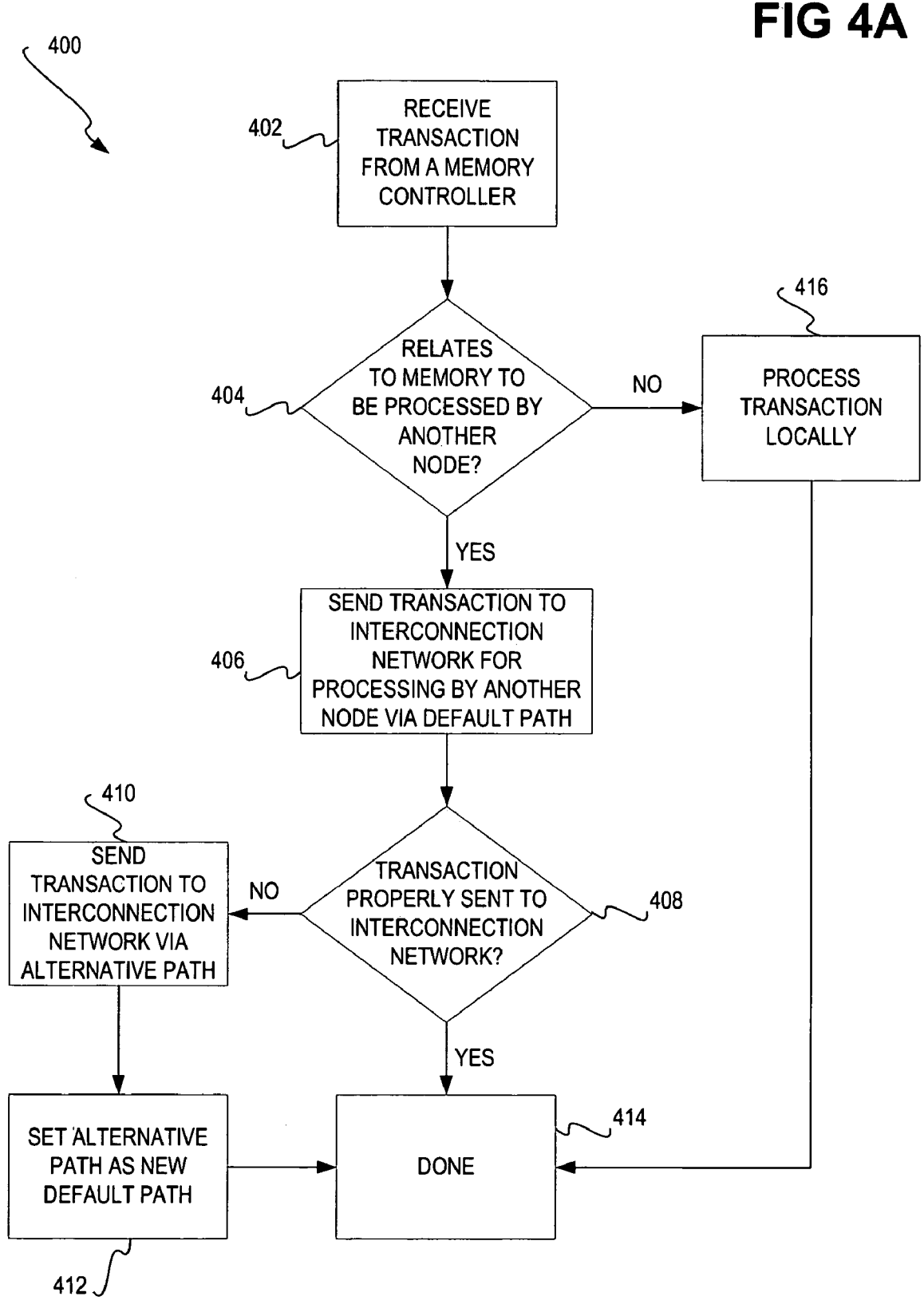
FIG. 4A is a flowchart of a method for handling a transaction by a coherency controller of a node, where the transaction may have to be processed by another node such that it is sent over an interconnection network, according to an embodiment of the invention.

FIG. 4A shows a method 400 for processing a transaction that is internally generated within a node, according to an embodiment of the invention. The method 400 is performed by a coherency controller of a node of a multiple-node system. For example, the coherency controllers 102 and 104 of the node 100 of FIGS. 1 and 3 can perform the method 400 in one embodiment of the invention. That is, in one embodiment, the method 400 is performed by each of a pair of coherency controllers of a node. Furthermore, the functionality performed by the method 400, as well as by other methods of embodiments of the invention, can be implemented as means within a computer-readable medium that may be part of a coherency controller of a node of a multiple-node system. The computer-readable medium may be a data storage medium, for instance.

A transaction is initially received from a memory controller of the node of which the pair of coherency controllers is a part (402). The transaction may be a request or a response received from the processors to which the coherency controller in question is coupled. The transaction may relate to the local memory for which the coherency controller performing the method 400 is responsible, or remote memory that is the local memory of another node of the system for which the coherency controller performing the method 400 is responsible.

If the transaction relates to a memory address that requires processing by another node (404), then the controller sends the transaction to the interconnection network for processing by another node, via a default path to the interconnection network (406). If the transaction is not properly sent to the interconnection network (408), however, then the coherency controller sends the transaction to the interconnection network via an alternative path (410). The alternative path is then set as the new default path (412), and the method 400 is finished (414). If the transaction was sent properly to the interconnection network (408) in the first instance, then the method 400 is also finished (414).

If the transaction instead relates to a memory address that does not require processing by another node (404), then the transaction is processed locally within the node (416). Local processing of the transaction occurs at the coherency controller of the node receiving the transaction from a memory controller of the node. For instance, if the transaction relates to the local memory for which the coherency controller performing the method 400 is responsible, then this coherency controller may process the transaction. The method 400 is then finished (414).

Figure 4B:
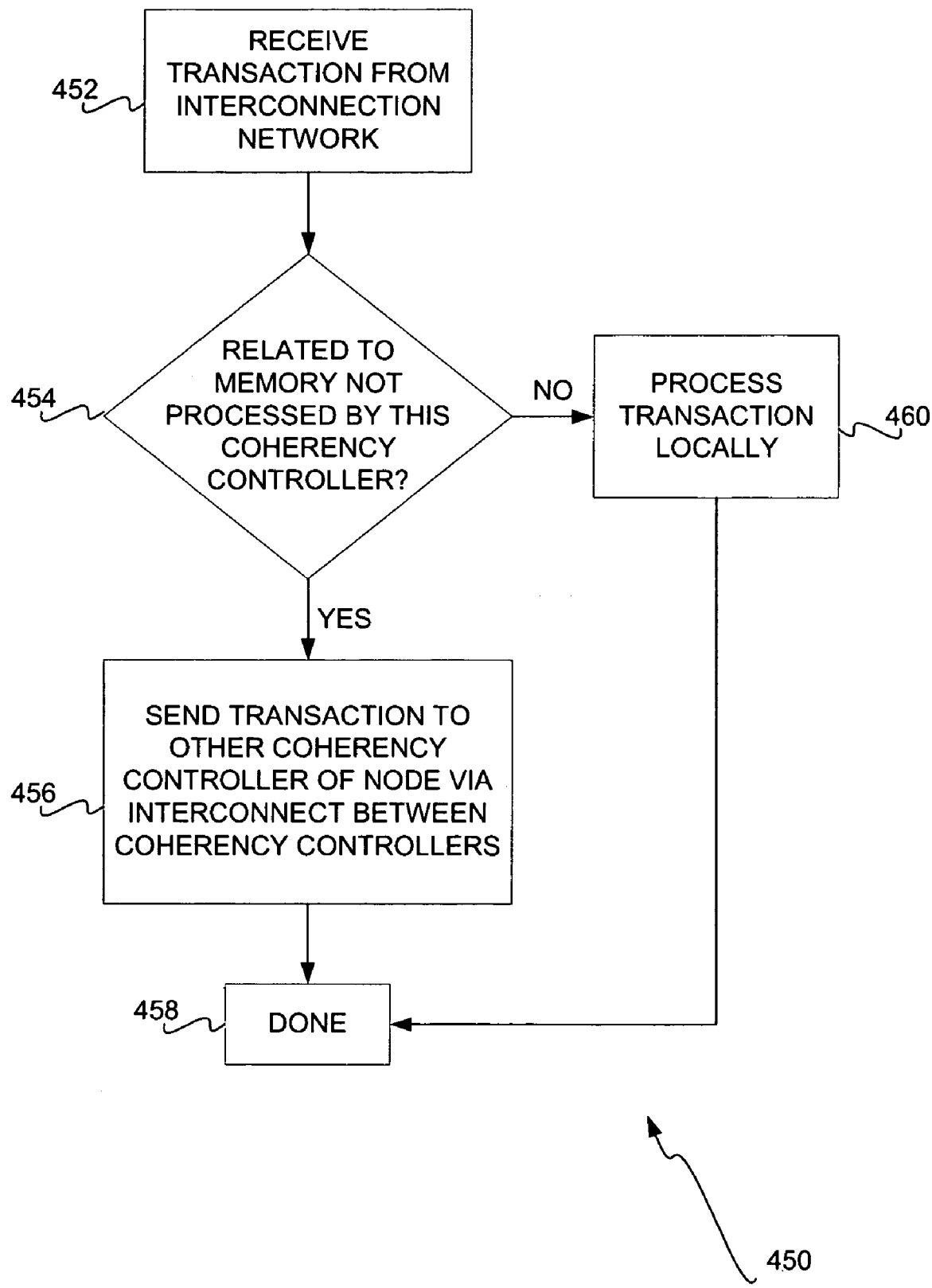
FIG. 4B is a flowchart of a method for handling a transaction by a coherency controller of a node, where the transaction is received from over an interconnection network and also may have to be processed by the other coherency controller of the same node, according to an embodiment of the invention.

FIG. 4B shows a method 450 for processing a transaction that is externally generated with respect to a node, and is received by the node from over one of the interconnection networks 204 of FIG. 2, according to an embodiment of the invention. Similar to the method 400 of FIG. 4A, the method 450 of FIG. 4B is performed by a coherency controller of a node of a multiple-node system. For instance, the method 450 may be performed by each coherency controller of a pair of coherency controllers of a given node.

A transaction is initially received by a coherency controller of a node from over one of the interconnection networks 204 (452). If the transaction relates to a memory address that requires processing by the other coherency controller of the node (454), then it is sent to that coherency controller via the interconnect between the two coherency controllers (456), and the method 450 is finished (458). Otherwise, if the transaction relates to a memory address that can be processed by the coherency controller that received the transaction (454), then the transaction is processed locally by this coherency controller (460), and the method 450 is finished (458).

Figure 5:
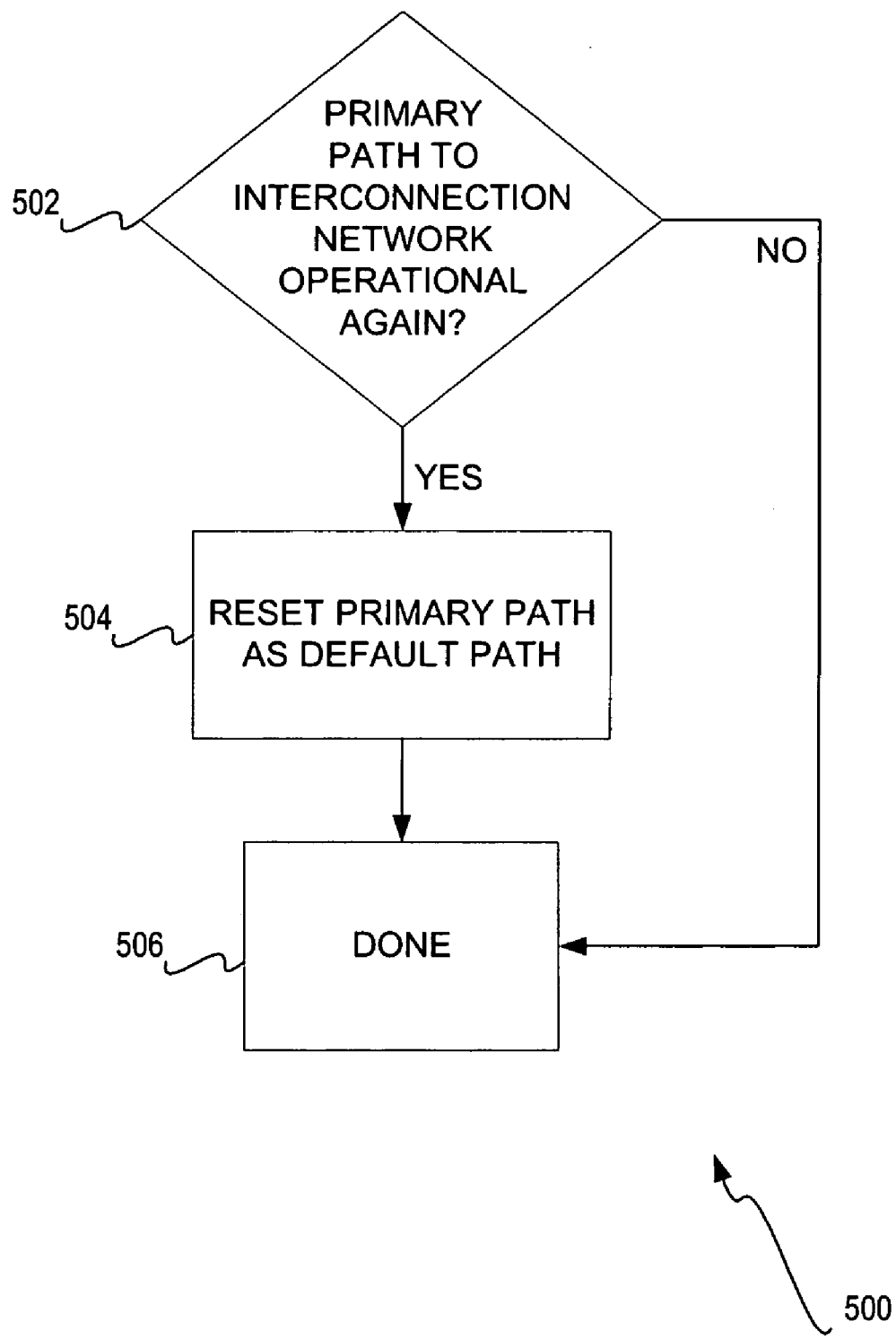
FIG. 5 is a flowchart of a method for resetting the default path of a coherency controller of a node to an interconnect back to the primary path of the coherency controller to the interconnect, according to an embodiment of the invention.

FIG. 5 shows a method 500, according to an embodiment of the invention. The method 500 is also performed by a coherency controller of a node of a multiple-node system. For example, the coherency controllers 102 and 104 of the node 100 of FIGS. 1 and 3 can perform the method 500 in one embodiment of the invention. The method 500 is performed periodically when the secondary, alternate path to the interconnection network has been set as the new default path. If the primary path to the interconnection network is again operational (502), then the coherency controller resets the primary path as the default path (504), and the method 500 is finished (506). If the primary path is still inoperative (502), such as by being faulty and having failed, then the method 500 is finished (506), without having reset the default path to the primary path.

Advantages over the Prior Art

Embodiments of the invention allow for advantages over the prior art. Each coherency controller of a node has a secondary, alternate, and indirect path to the interconnect through one or more other coherency controllers, in addition to its primary, default, and direct path. Therefore, redundancy is provided for, enabling the coherency controllers to still send transactions to other nodes even where the direct path to the interconnect or the interconnect network has failed. Furthermore, according to the one embodiment of the present invention, the alternate path of each coherency controller is the primary path of another coherency controller. Thus, redundancy is provided for in this embodiment without having to add new communication links representing additional paths from the coherency controller to the interconnect. Rather, the existing path of another coherency controller, utilizing existing communications links, is employed to serve as the alternative path for a coherency controller.

Alternative Embodiments

It will be appreciated that, although specific embodiments of the invention have been described herein for purposes of illustration, various modifications may be made without departing from the spirit and scope of the invention. For instance, the system that has been described as amenable to implementations of embodiments of the invention has been indicated as having a NUMA architecture. However, the invention is amenable to implementation in conjunction with systems having other architectures as well.

As another example, the system that has been described has two coherency controllers. However, more controllers may also be used to implement a system in accordance with the invention. As a result, a given coherency controller may have more than one alternate path to the interconnect. For example, where there are three coherency controllers, and where each coherency controller has a separate primary path through the link controller to the interconnect, each coherency controller may also have two alternate paths through the link controller to the interconnect, which are the primary paths of the other two controllers. Accordingly, the scope of protection of this invention is limited only by the following claims and their equivalents.

I claim:

1. A method for performance by a coherency controller of a node, comprising:
    determining whether transactions are being properly sent to other nodes of a plurality of nodes including the node of which the coherency controller is a part via a primary path; and,
    in response to determining that the transactions are not being properly sent to the other nodes via the primary path, sending the transactions to the other nodes via a secondary path through a second coherency controller of the node.

2. The method of claim 1, further comprising, in response to determining that the transactions are to be processed by one of the other nodes, sending the transactions to the one of the other nodes via the primary path.

3. The method of claim 1, further comprising, in response to determining that the transactions are to be processed by the coherency controller, processing the transactions locally.

4. The method of claim 1, wherein determining whether the transactions are being properly sent to the other nodes via the primary path comprises determining whether the transactions are being received properly.

5. The method of claim 1, wherein sending the transactions to the other nodes via the secondary path comprises sending the transactions to the second coherency controller of the node, the second coherency controller sending the transactions to the other nodes.

6. A system comprising:
    at least one interconnection network; and,
    a plurality of nodes connected to one another via the at least one interconnection network, each node comprising:
        a processor;
        local memory associated with the processor;
        a plurality of paths connecting the node to the at least one interconnection network; and,
        a plurality of coherency controllers to process transactions relating to the local memory of the node and to send transactions relating to the local memory of other nodes to the other nodes through the at least one interconnection network, each coherency controller having a primary path to the at least one interconnection network as one of the plurality of paths and one or more secondary paths to the at least one interconnection network as one or more of the plurality of paths.

7. The system of claim 6, wherein the at least one interconnection network comprises a first interconnection network and a second interconnection network, and the plurality of coherency controllers of each node comprises a first coherency controller and a second coherency controller.

8. The system of claim 7, wherein the primary path of the first coherency controller of each node serves as a secondary path of the second coherency controller of the node, and the primary path of the second coherency controller of each node serves as a secondary path of the first coherency controller of the node.

9. The system of claim 6, wherein each coherency controller of each node sends the transactions relating to the local memory of the other nodes via one of the one or more secondary paths thereof where the primary path thereof is at fault.

10. The system of claim 6, wherein each coherency controller of each node is able to determine whether the primary path thereof is at fault, such that the coherency controller utilizes one of the one or more secondary paths thereof instead.

11. The system of claim 6, wherein each coherency controller of each node is responsible for processing transactions relating to a different part of the local memory of the node.

12. The system of claim 11, wherein each coherency controller of each node sends transactions relating to the local memory of the node for which another coherency controller of the node is responsible to the other coherency controller of the node for processing thereby.

13. The system of claim 6, wherein the plurality of coherency controllers of each node comprises a first coherency controller responsible for processing transactions relating to even memory lines of the local memory of the node and a second coherency controller responsible for processing transactions relating to odd memory lines of the local memory of the node.

14. A system comprising:
a first interconnection network and a second interconnection network; and,
a plurality of nodes connected to one another via each of the first interconnection network and the second interconnection network, each node comprising:
a processor;
local memory associated with the processor;
a first coherency controller to process transactions relating to a first part of the local memory of the node and to send transactions relating to the local memory of other nodes to the other nodes through a default path to the first interconnection network; and,
a second coherency controller to process transactions relating to a second part of the local memory of the node and to send transactions relating to the local memory of the other nodes to the other nodes through a default path to the second interconnection network,
wherein the default path to the second interconnection network serves as an alternate path for the first coherency controller where the default path to the first interconnection network is at fault, and the default path to the first interconnection network serves as an alternate path for the second coherency controller where the default path to the second interconnection network is at fault.

15. A node of a multi-node system comprising:
a plurality of processors;
local memory for the plurality of processors;
a plurality of paths connecting the node to one or more interconnection networks interconnecting the node with other nodes of the multi-node system; and,
a plurality of coherency controllers to process transactions relating to the local memory of the node and to send transactions relating to the local memory of the other nodes to the other nodes through the one or more interconnection networks, each coherency controller having a primary path to the one or more interconnection networks as one of the plurality of paths and one or more secondary paths to the one or more interconnection networks as one or more of the plurality of paths.

16. The node of claim 15, wherein each coherency controller utilizes one of the one or more secondary paths thereof when the primary path thereof has failed.

17. The node of claim 15, wherein the plurality of coherency controllers comprises a first coherency controller to process transactions relating to odd local memory addresses and a second coherency controller responsible to process transactions relating to even local memory addresses.

18. A node of a system of nodes interconnected via each of a first interconnection network and a second interconnection network, the node comprising:
a processor;
local memory associated with the processors;
a first coherency controller to process transactions relating to a first part of the local memory of the node and to send transactions relating to the local memory of other nodes of the system to the other nodes through a default path to the first interconnection network; and,
a second coherency controller to process transactions relating to a second part of the local memory of the node and to send transactions relating to the local memory of the other nodes to the other nodes through a default path to the second interconnection network,
wherein the default path to the second interconnection network serves as an alternate path for the first coherency controller where the default path to the first interconnection network is at fault, and the default path to the first interconnection network serves as an alternate path for the second coherency controller where the default path to the second interconnection network is at fault.

* * * * *